United States Patent [19]

Shelly

[11] 4,302,803
[45] Nov. 24, 1981

[54] RECTIFIER-CONVERTER POWER SUPPLY WITH MULTI-CHANNEL FLYBACK INVERTER

[75] Inventor: Randolph D. W. Shelly, Rosemere, Canada

[73] Assignee: Sperry Corporation, New York, N.Y.

[21] Appl. No.: 112,573

[22] Filed: Jan. 16, 1980

[51] Int. Cl.³ .............................................. H02M 3/335
[52] U.S. Cl. ........................................ 363/20; 363/41
[58] Field of Search .................. 363/20, 21, 26, 94, 363/41

[56] References Cited

U.S. PATENT DOCUMENTS

| | | | |
|---|---|---|---|
| 4,020,408 | 4/1977 | Grant | 363/21 |
| 4,028,606 | 6/1977 | Beuchee et al. | 363/20 |
| 4,070,701 | 1/1978 | Harnden, Jr. et al. | 363/97 X |
| 4,208,706 | 6/1980 | Suzuki et al. | 363/26 |

Primary Examiner—William M. Shoop
Attorney, Agent, or Firm—Douglas L. Tschida; Kenneth T. Grace; William E. Cleaver

[57] ABSTRACT

An AC to DC power supply having a multi-channel, flyback inverter output section regulated via a fixed frequency, pulse width modulation controller. The controller indirectly regulates each channel by regulating an auxiliary channel, whereby the duty cycle of a switching transistor in the flyback inverter section is varied to maintain a constant DC voltage on the auxiliary channel and correspondingly on each output channel.

3 Claims, 5 Drawing Figures

RECTIFIER-CONVERTER POWER SUPPLY WITH MULTI-CHANNEL FLYBACK INVERTER

BACKGROUND OF THE INVENTION

The present invention is related to converting power supplies and more specifically to a converting power supply containing an indirectly regulated, multi-channel flyback inverter section. Such a power supply provides a simple, reliable, low-cost substitute to series regulated, linear transformer power supplies.

Flyback inverters are particularly effective in supplying low power output channels at either high or low output voltages. In combination with a bulk rectifier, a number of such output channels can be achieved, but the direct regulation of the output channels presents the problem of cross regulation. It is therefore desirable to regulate the output channels indirectly, which the present invention achieves via the use of an auxiliary channel and a fixed frequency pulse width modulation controller which controls the duty cycle of a switching transistor coupled to the power supply's flyback inverter transformer.

It is therefore an object of the present invention to provide a low-cost, regulated, multi-channel DC power supply operating from an AC line.

It is a further object to indirectly regulate each of the channels of the power supply simultaneously without attendant cross regulation problems.

It is a further object to electrically isolate the regulation circuitry from the AC line and output channels.

These objects and those other obvious from the description which follows hereinafter are achieved with the present invention.

SUMMARY OF THE INVENTION

A technique and controller are disclosed for indirectly regulating each channel of a power supply containing a multi-channel flyback inverter. The controller operates to monitor an auxiliary winding of a flyback inverter transformer and produce a fixed frequency, pulse width modulated drive signal that is used to regulate the duty cycle of a switching transistor coupled to the primary winding of the transformer. Thus the controller responds to voltage fluctuations on the auxiliary winding to vary the current flow in the primary winding, which action indirectly regulates each of the output channels and causes them to produce a proportionately constant output voltage.

The controller is essentially comprised of a threshold level detector for enabling a fixed frequency timer; a reference level detector for determining variations in the voltage level across the auxiliary winding and varying the pulse width of a base drive signal produced by the timer; and a current sensor for monitoring the current flowing in the primary winding and over-riding the reference level detector during conditions where excess current is flowing in the primary winding.

DESCRIPTION OF THE PREFERRED EMBODIMENT

Figure 1:
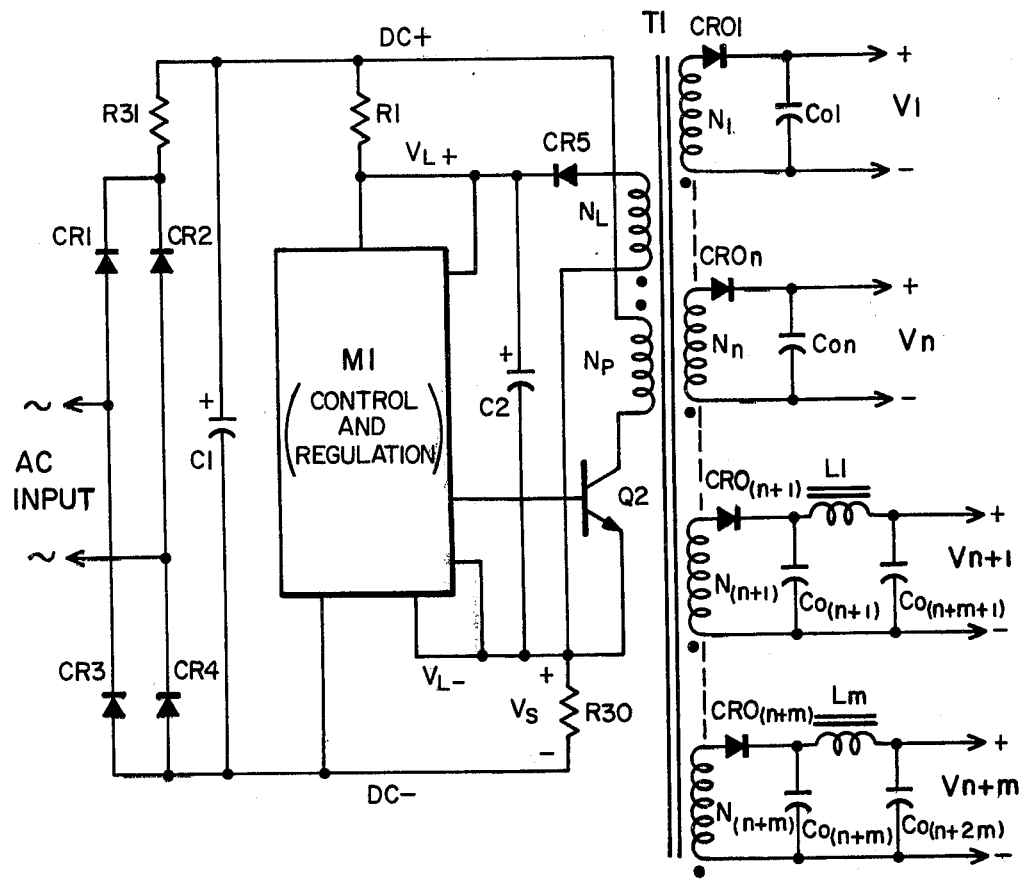
FIG. 1 is a generalized block diagram of a regulated, multi-channel AC to DC power supply incorporating an auxiliary channel and controller for indirectly regulating each of the output channels.

The present invention is directed to a technique for indirectly regulating the outputs of a multi-channel, flyback inverter where the outputs can be of a positive or negative polarity and isolated from each other or have a common return. Referring to FIG. 1, a generalized block diagram of such a power supply is shown with n high voltage output channels and (n+m) low voltage output channels. To better describe the present invention, a brief description will be directed to the operation of the generalized power supply of FIG. 1 and then a more specific description will be directed to the detailed power supply of FIG. 2 and the associated waveforms of FIG. 3.

The power supply of FIG. 1 first consists of a rectifier section comprised of diodes CR1, CR2, CR3, CR4, and capacitor C1. An AC input, typically on the order of 100 to 120 volts, is applied to the junctions between diodes CR1 and CR3 and diodes CR2 and CR4. The AC voltage is then rectified to an unregulated DC bulk voltage, typically 130 to 180 volts. The unregulated bulk DC voltage is impressed across the primary winding $N_p$ of flyback inverter transformer T1, switching transistor Q2 and sense resistor R30. The base of switching transistor Q2 is then driven via the M1 controller which produces a pulse width modulated base current for controlling the on and off time or duty cycle of switching transistor Q2. The duty cycle of switching transistor Q2 is controlled in relation to the stepped-down logic voltage $V_L$ that develops across the parallel combination of capacitor C2, diode CR5 and the auxiliary winding $N_L$. The logic voltage $V_L$, typically 12 volts, is then monitored and maintained at a constant level by controller M1.

During normal operation, with switching transistor Q2 turned on, current flows through the primary winding $N_p$ and energy is stored in the winding. The auxiliary winding $N_L$ and each of the secondary windings are at the same time reversed biased due to the individual diodes CR5, $CR_{01}$ thru $CR_{ON}$ and $CR_{0(N+1)}$ thru $CR_{0(N+M)}$ coupled in series with the windings. When the base drive to switching transistor Q2 is discontinued, causing transistor Q2 to turn off, the auxiliary winding $N_L$ and each of the secondary windings are forward biased and the energy stored in the primary winding $N_p$ is transferred to the auxiliary and second windings and the voltages across the respective windings increases at a rate determined by the channel loads and capacitors C2, $C_{01}$ thru $C_{ON}$ and $C_{0(N+1)}$ thru $C_0(N+M)$. The maximum level to which the voltage $V_L$ can rise, however, is limited as previously described.

Maintaining $V_L$ at a constant level produces a similar constant voltage which is clamped by diode CR5 across the auxiliary winding $N_L$. This voltage in turn is proportional to the high and low output voltages that appear on each of the output channels, which individual proportions are dependent on the turns ratios between $N_L$ and each of the secondary output windings $N_l$ thru $N_n$ and $N_{n+1}$ thru $N_{n+m}$. Thus, the output voltage on each of the output channels is indirectly regulated to a similarly constant but proportionate level.

Figure 2:
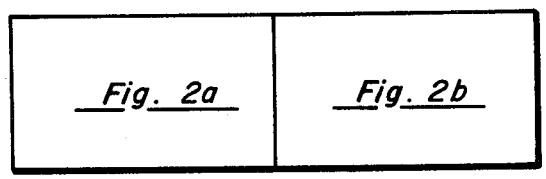
FIGS. 2a and 2b are detailed circuit schematics of the power supply of FIG. 1 and the fixed frequency, pulse width modulation controller used to control the duty cycle of the flyback inverter section.
Figure 2A:
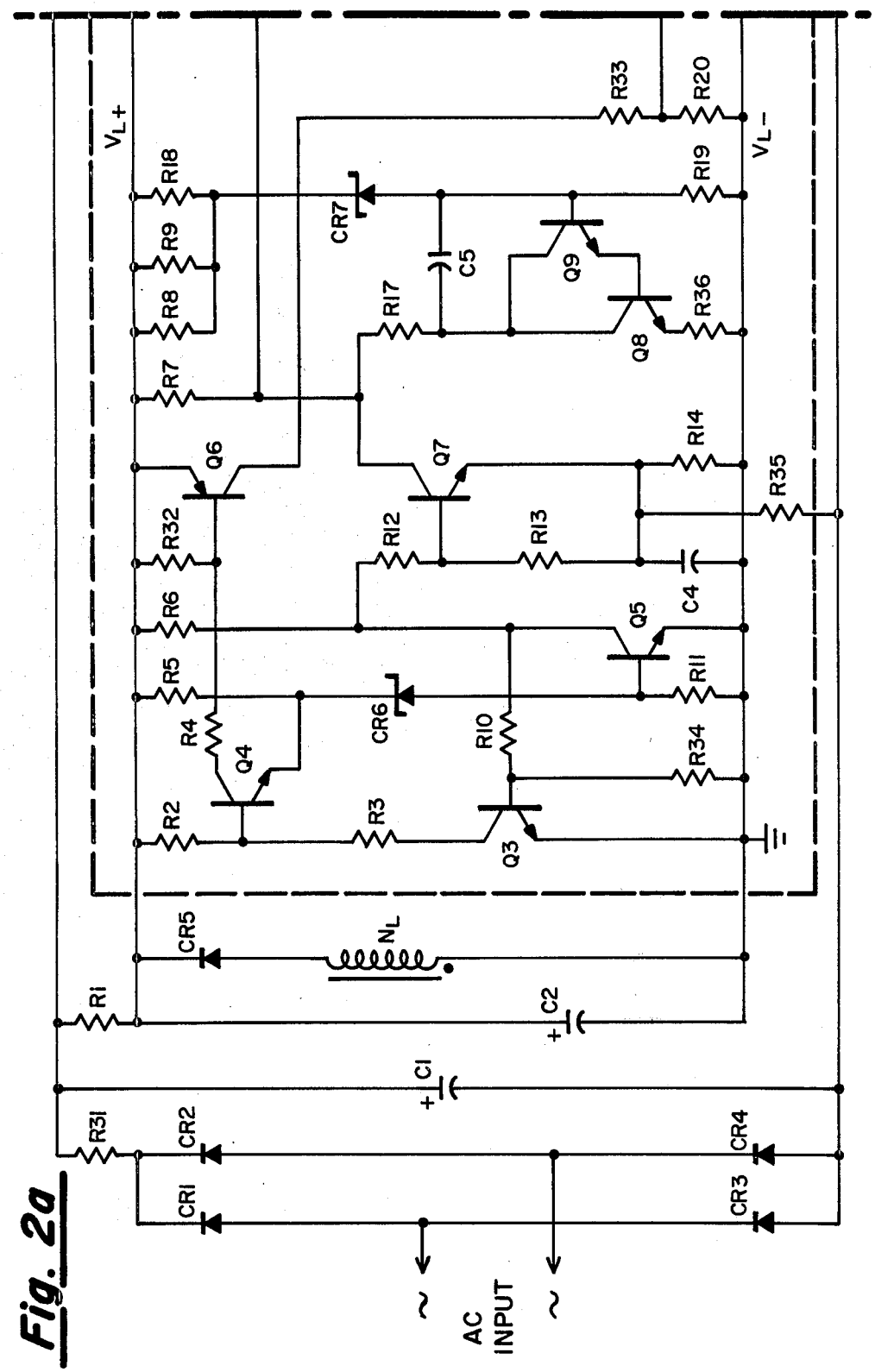
Figure 2B:
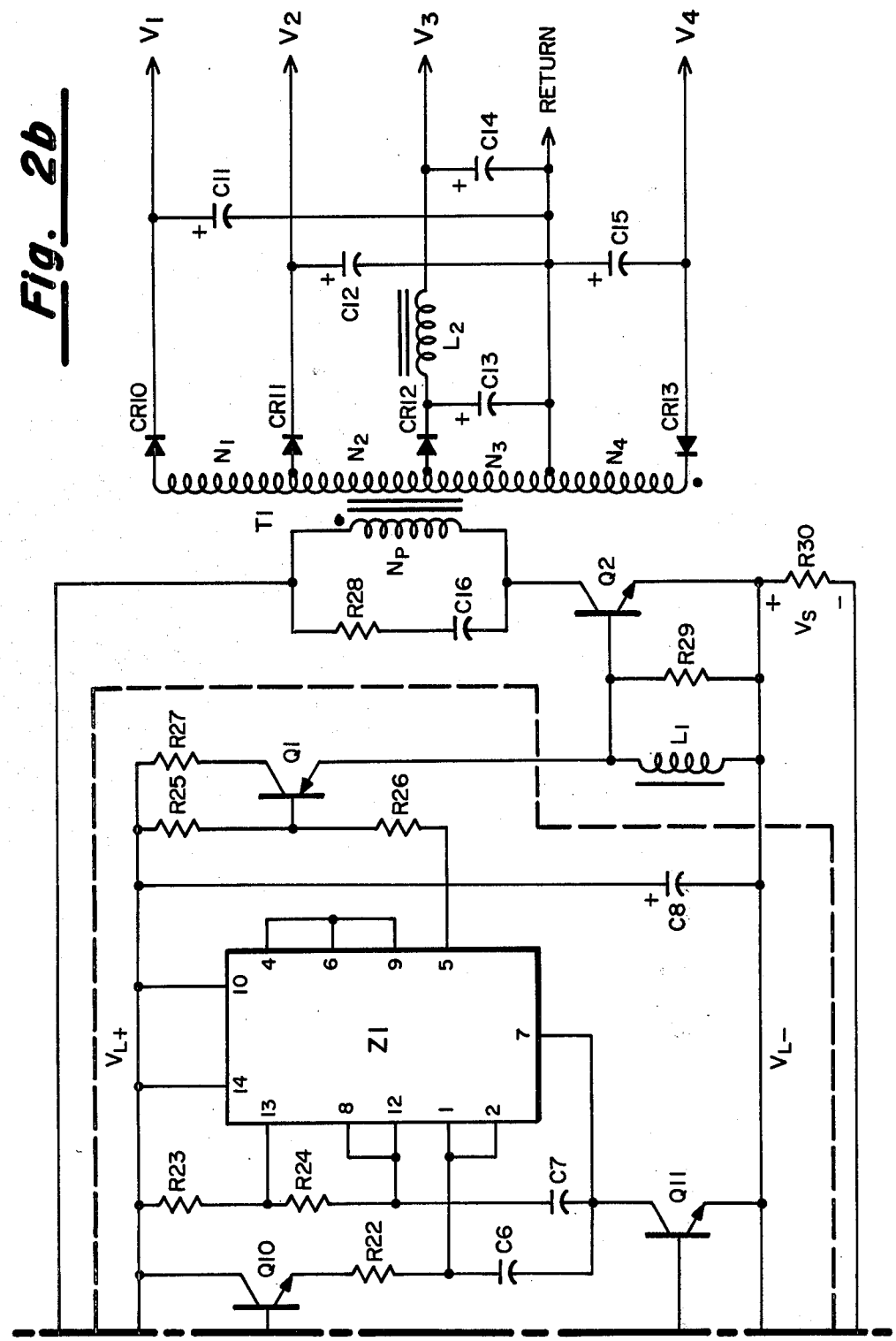
Figure 3:
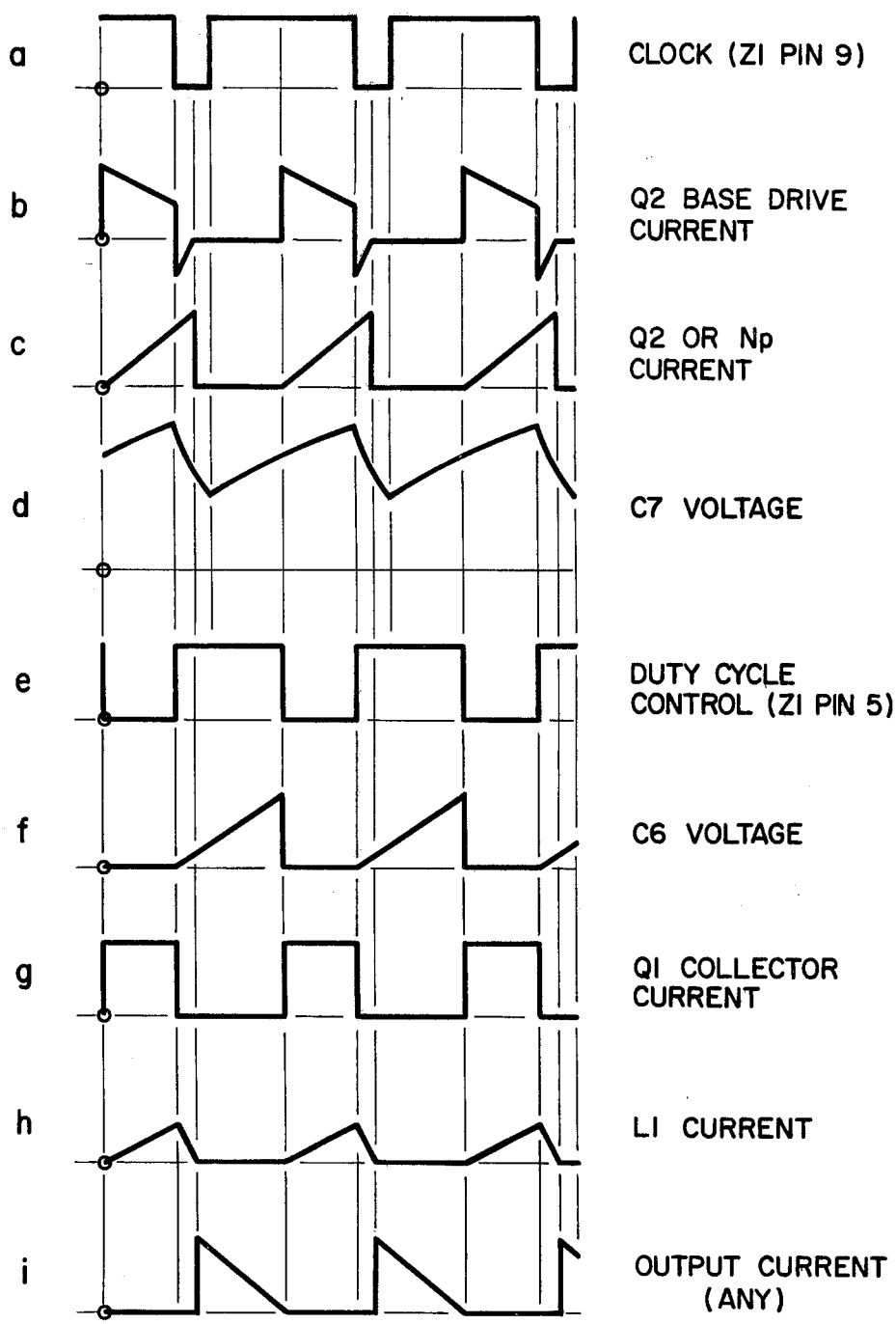
FIG. 3 is a diagram of the waveforms of several signals generated by the controller M1.

Referring now to FIGS. 2 and 3 and recognizing that controller M1 operates at a clock frequency of approximately 50 KHz, a more detailed description of the operation of controller M1 will be provided. Assuming that the base drive to switching transistor Q2 has been discontinued and capacitor C2 has charged to the logic voltage $V_L$, as controller M1 begins to supply base drive current to switching transistor Q2, capacitor C2 begins to discharge and supply power to controller M1. As capacitor C2 discharges though, the level of logic voltage $V_L$ begins to fall towards a disable level $V_d$, at which controller M1 will discontinue operating; but as the level of logic voltage $V_L$ is falling, the voltage across the auxiliary winding $N_L$ is rising which forward biases zener diode CR5, thereby providing the additional power necessary to sustain the operation of controller M1 and maintaining the level of the logic voltage $V_L$ across capacitor C2. Depending on the voltage level capacitor C2 discharges to during the on time of controller M1, the duty cycle of controller M1 will vary to maintain the logic voltage $V_L$ at the desired 12 volt level.

Controller M1 first begins to operate when the bulk DC voltage charges capacitor C2 via resistor R1 to a voltage sufficient to cause the threshold detector, comprised of resistors R5 and R11, zener diode CR6 and transistor Q5, to conduct. When capacitor C2 reaches the enable voltage $V_e$, transistor Q5 turn on which causes transistor Q3 to turn off and transistor Q4 to turn on which produces a latching action, via transistor Q4 and zener diode CR6, that causes controller M1 to continue to operate so long as the disable level $V_d$ is exceeded. The conduction of transistor Q4 also causes transistor Q6 to turn on, which in turn causes transistor Q11 to turn on and supply power to dual timer Z1.

The conduction of transistor Q11 initiates the clock frequency control network comprised of resistors R23, R24, capacitor C7 and one of the duplicate halves of dual timer Z1, which half consists of a single shot multivibrator having an adjustable on time and configured to reset at the beginning of each clock cycle. The period of the clock signal will be dependent on the charge and discharge times of capacitor C7, see waveform (d) of FIG. 3, and the corresponding voltages applied to terminals 8, 12 and 13. A typical clock signal established by the frequency control network can be seen with reference to waveform (a) of FIG. 3.

The duty cycle for any given clock cycle of controller M1 is established by the second half of dual timer Z1 and the reference and error amplifier circuitry, which circuitry essentially comprises zener diode CR7 and transistors Q8 and Q9. The level of the reference voltage $V_R$, typically 9 volts, is established by the resistor network R8, R9 and R18, zener diode CR7 and resistor R19 and is adjustable by varying the effective resistance of the resistor network depending on the breakdown characteristics of zener diode CR7, but the net effect is to establish the reference voltage $V_R$ for controller M1. If the level of the logic voltage $V_L$ exceeds the reference voltage $V_R$, depending on the magnitude of the difference, the Darlington amplifier, comprised of transistors Q8 and Q9, resistors R7, R17 and R36 and capacitor C5, will amplify the difference and conduct to a greater or lesser extent as the difference increases or decreases. The conduction of transistors Q8 and Q9 in turn affects the conduction of transistor Q10 and the charge time of capacitor C6. As the difference between $V_L$ and $V_R$ increases, transistors Q8 and Q9 conduct more current, thereby reducing the amount of available base current to transistor Q10, reducing the charge time of capacitor C6 and increasing the on time of the base drive to switching transistor Q2. Thus, controller M1's duty cycle is inversely related to the difference between the logic voltage $V_L$ and the reference voltage $V_R$. Typical waveforms of the pulse width modulated duty cycle control signal produced on terminal 5 of the dual timer Z1 and the voltage on terminals 1 and 2 are shown in waveforms (e) and (f) of FIG. 3.

The modulated duty cycle control signal that appears on terminal 5 of the dual timer Z1 is then coupled to resistors R25, R26, R29 and the base of transistor Q1. When the signal is low, transistor Q1 turns on and produces the base drive current to switching transistor Q2, referring to the typical waveforms (g), (h) and (b) of FIG. 3, the resulting transistor Q1 collector current, inductor L1 current and transistor Q2 base drive current can be seen. It is to be noted that while inductor L1 may be deleted from the present embodiment, the inductor adds a negative component to the switching transistor Q2 base current which causes switching transistor Q2 to turn off faster at the end of switching transistor Q2's on time. It should also be noted that resistor R28 and capacitor C16 are provided to reduce ringing in transformer T1 and switching loses that would otherwise occur switching in transistor Q2.

During normal operation, controller M1 also monitors the resulting primary winding $N_p$ current, see waveform c of FIG. 3, and acts to override the reference and error amplifier circuitry during start up and at other times where excessive current flows through the primary winding $N_p$. This function is performed by the current sense circuitry which essentially consists of resistor R30 and transistor Q7. Resistor R30 acts to sense the current flow through the primary winding $N_p$ and the collector of switching transistor Q2, see waveform c of FIG. 3, and produce a proportionate negative sense voltage $V_S$ which is coupled via resistor R35, capacitor C4 and resistor R14 to the emitter of transistor Q7. At the same time resistors R12 and R13 isolate the base of transistor Q7 from the sense voltage $V_S$ and bias the base of transistor Q7 in response to the additional current provided when transistor Q4 turned on. Depending on the level of the current flowing through the primary winding $N_p$ and the negative sense voltage $V_S$ applied to the emitter of transistor Q7, transistor Q7 will turn on and conduct varying amounts of current away from the base of transistor Q10. This action, like the previously described action of the reference and error amplifier circuitry, affects the rate of charge of capacitor C6 and varies the pulse width and base drive to switching transistor Q2. The controller M1 therefore provides dual mechanisms for controlling the current flow through the primary winding $N_p$ and the consequent voltage on the auxiliary winding $N_L$.

The secondary windings $N_1$, $N_2$, $N_3$, and $N_4$ responding to the regulated current flow through the primary winding $N_p$, each produce a constant voltage on their respective output terminals at a level determined by the respective turns ratio between the auxiliary winding $N_L$ and each of the secondary winding $N_1$, $N_2$, $N_3$, and $N_4$. The output current flowing through each of the secondary windings will typically appear as current waveform (i) of FIG. 3. The output current has this characteristic, since each secondary winding is reverse biased during the on time of switching transistor Q2, and then forward biased and conducting during the off time of switching transistor Q2. It is to be noted that while the individual output voltages $V_1$ through $V_n$ and $V_{n+1}$ through $V_{n+m}$ are for all practical purposes at a DC level, they do contain some AC component which is dependent on the value of their filter capacitors C11, C12, C13, and C15. It is generally desirable that this AC component (ripple) be relatively low with respect to the DC component, and in those cases where a lower AC component is desired, it can be achieved by adding an inductor and capacitor in the fashion of inductors L2 and capacitor C14.

While the present invention has been described with reference to the preferred embodiment, it is to be recognized that the principles taught are applicable to other power supplies which require an indirect method and means for regulating their output channels. It is therefore contemplated that the following claims should be interpreted to cover other power supplies incorporating the invention described and claimed herein.

What is claimed is:

1. A converting power supply, comprising:
    means for converting an AC voltage to an unregulated DC voltage;
    a flyback inverter coupled to said converter means, comprising;
        a transformer having a primary winding coupled to said unregulated DC voltagve, at least one secondary winding and an auxiliary primary winding, and
        switch means for causing said transformer to store power in said primary winding during the ON time of said switch means and for causing said transformer to induce an output on said secondary winding during the OFF time of said switch means, and
    pulse width modulation control means coupled to said auxiliary primary winding and said switch means and operable in a mode for controlling the duty cycle of said switch means, said pulse width modulation control means comprising;
        a fixed frequency timer,
        threshold detector means for ensuring that said pulse width modulation control means operates only so long as a disable voltage level is exceeded, and
        reference detector means coupled to said switch means for comparing the voltage across said auxiliary primary winding to a reference voltage and producing a pulse width modulated (PWM) signal, the period of said PWM signal being determined by said fixed frequency timer and the duration of the ON time being inversely related to the difference between the reference and auxiliary primary winding voltages,
    said pulse width modulation control means thereby regulating the voltage across each of said secondary windings.

2. An improved power supply having a transformer with a primary winding, at least one secondary winding and switch means for controlling the current flow through said primary winding, whereby power is stored in said primary winding during the ON time of said switch means and induced on said secondary winding as an output during the OFF time of said switch means, the improvement comprising:
    an auxiliary primary winding;
    pulse width modulation control means coupled to said auxiliary primary winding and said switch means and operable in a simultaneous mode for controlling the duty cycle of said switching means so as to maintain a constant voltage across said auxiliary primary winding, said pulse width modulation control means comprising:
        a fixed frequency timer,
        threshold detector means for ensuring that said pulse width modulation control means operates only so long as a disable voltage level is exceeded, and
        reference detector means coupled to said switch means for comparing the voltage across said auxiliary primary winding to a reference voltage and producing a pulse width modulated (PWM) signal, the period of said PWM signal determined by said fixed frequency timer and the duration of the ON time inversely related to the difference between the reference and auxiliary winding voltages,
    said pulse width modulation control means thereby regulating said secondary winding.

3. A power supply as set forth in claim 1 or 2 including means for overriding said reference detector means during periods when excess current flows in said primary winding and controlling the duration of the ON time of said switch means.

* * * * *